United States Patent
Weber et al.

(10) Patent No.: US 9,771,490 B2
(45) Date of Patent: Sep. 26, 2017

(54) INKS FOR 3D PRINTING GRADIENT REFRACTIVE INDEX (GRIN) OPTICAL COMPONENTS

(71) Applicant: Vadient Optics, LLC., Beaverton, OR (US)

(72) Inventors: Christopher D Weber, Eugene, OR (US); Charles G. Dupuy, Corvallis, OR (US); John Paul Harmon, Albany, OR (US); David M. Schut, Philomath, OR (US)

(73) Assignee: Vadient Optics, LLC, Beaverton, OR (US)

( * ) Notice: Subject to any disclaimer, the term of this patent is extended or adjusted under 35 U.S.C. 154(b) by 0 days.

(21) Appl. No.: 15/240,263

(22) Filed: Aug. 18, 2016

(65) Prior Publication Data

US 2017/0029643 A1 Feb. 2, 2017

Related U.S. Application Data

(63) Continuation-in-part of application No. 14/888,533, filed as application No. PCT/US2014/036660 on May 2, 2014, now Pat. No. 9,447,299.

(60) Provisional application No. 61/818,534, filed on May 2, 2013, provisional application No. 61/818,548, filed on May 2, 2013, provisional application No. 61/818,544, filed on May 2, 2013, provisional application No. 61/819,104, filed on May 3, 2013.

(51) Int. Cl.
C09D 11/38 (2014.01)
C09D 11/101 (2014.01)
B33Y 70/00 (2015.01)

(52) U.S. Cl.
CPC ............ C09D 11/38 (2013.01); C09D 11/101 (2013.01); B33Y 70/00 (2014.12)

(58) Field of Classification Search
CPC ........ C09D 11/38; C09D 11/101; C08K 3/22; C08K 3/28; C08K 3/34; C08K 7/26; C08K 9/02; C08K 2003/282; C08K 2003/2241; C08K 2003/2244; G02B 3/0087; G02B 1/041; G02B 27/0062; B33Y 70/00
See application file for complete search history.

(56) References Cited

U.S. PATENT DOCUMENTS

2012/0256141 A1* 10/2012 Nick .................... C08K 9/10
                                                        252/519.21

* cited by examiner

*Primary Examiner* — Robert Jones, Jr.

(57) ABSTRACT

Optical inks suitable for 3D printing fabrication of gradient refractive index (GRIN) optical components are composed a monomer matrix material doped with ligand-functionalized nanoparticles, wherein the monomer has a viscosity less than 20 cPoise and is UV curable to form a solid polymer. The matrix material doped with the ligand-functionalized nanoparticles has a transmittance of at least 90% in a predetermined optical wavelength range, wherein the ligand functionalized nanoparticles have a size less than 100 nm, are loaded in the monomer matrix material at a volume percent of at least 2%, and alter an index of refraction of the monomer matrix by at least 0.02. The ligand-functionalized nanoparticles have a plurality of ligands attached to a nanoparticle core surface with an anchor functional group and terminated with a buoy functional group that are reactive, non-reactive, or combinations thereof. In some embodiments the ligands have a length less than 1.2 nm measured radially from the nanoparticle core surface.

10 Claims, 3 Drawing Sheets

Fig. 1A
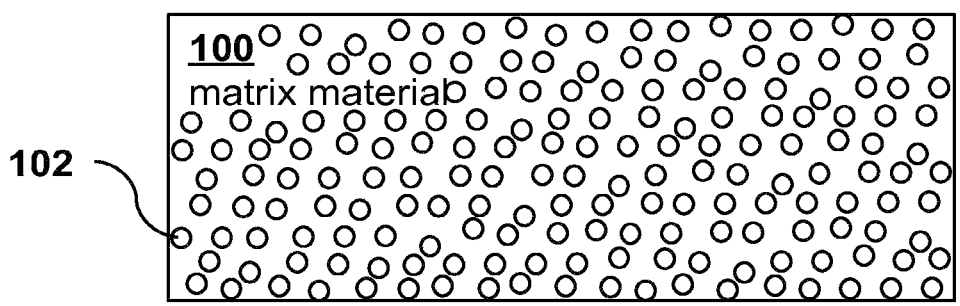
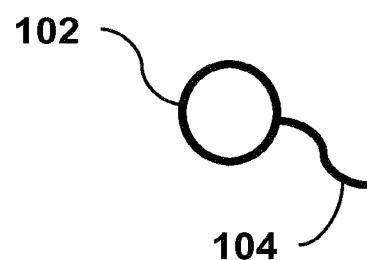
Fig. 1B

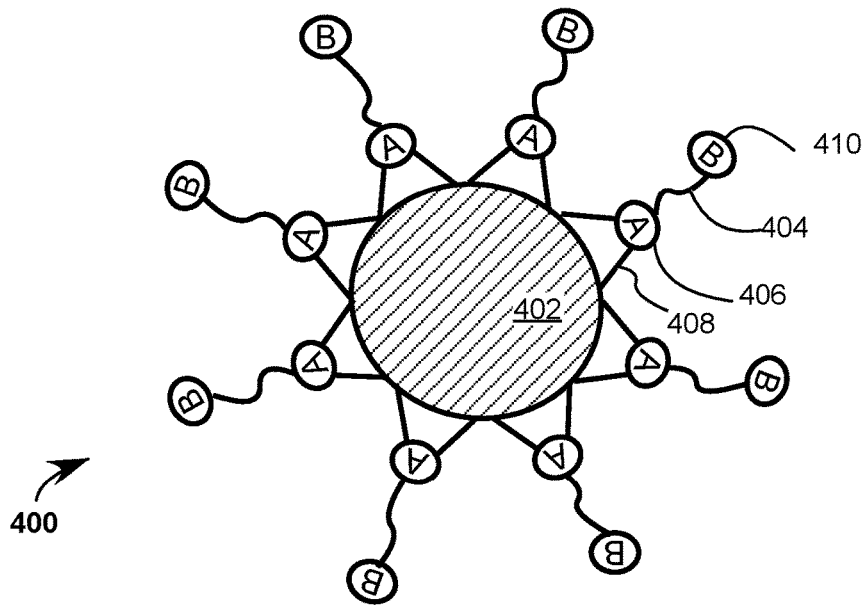
FIG. 4A
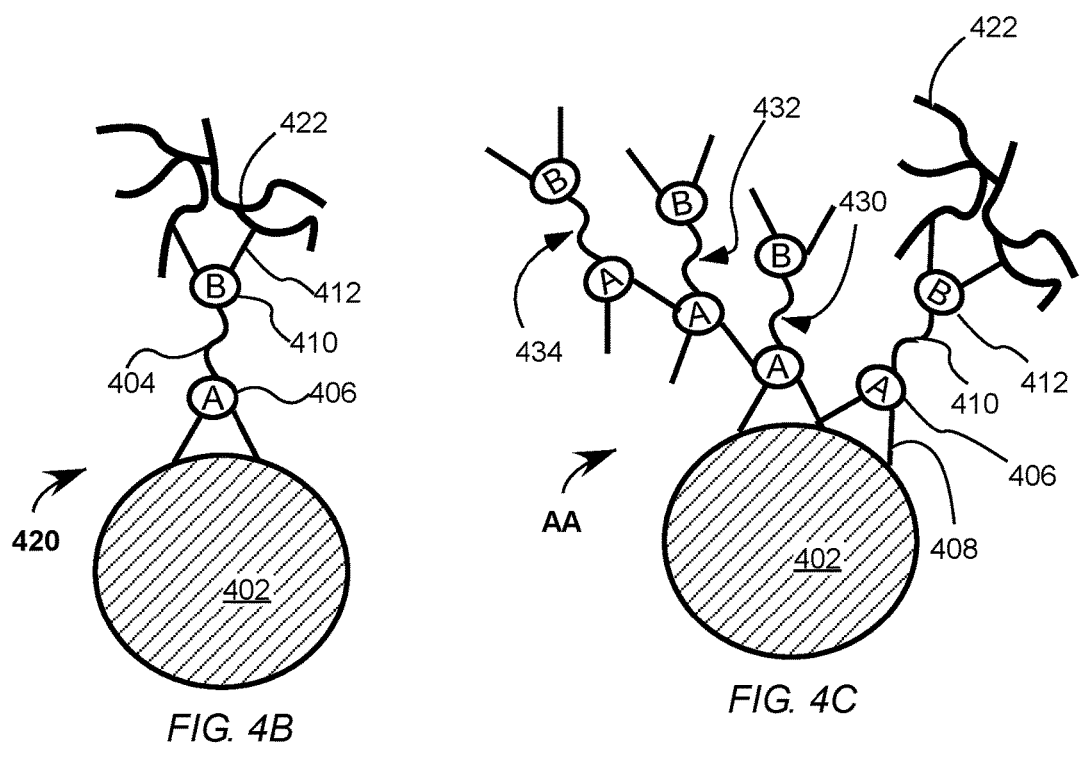
FIG. 4B
FIG. 4C

INKS FOR 3D PRINTING GRADIENT REFRACTIVE INDEX (GRIN) OPTICAL COMPONENTS

RELATED APPLICATIONS

This application is a continuation-in-part of U.S. patent application Ser. No. 14/888,533 filed on Nov. 2, 2015, which is a national stage entry of international patent application PCT/US2014/36660 that claims priority to: U.S. Provisional Application 61/819,104 filed on May 3, 2013; U.S. Provisional Application 61/818,544 filed on May 2, 2013; U.S. Provisional Application 61/818,534 filed on May 2, 2013; and U.S. Provisional Application 61/818,548 filed on May 2, 2013.

GOVERNMENT INTEREST

This invention was made with government support under contract FA8650-12-C-7226 award by the Air Force Research Laboratory. The government has certain rights in the invention.

FIELD OF THE DISCLOSURE

The present disclosure relates generally to optical ink compounds. More specifically, it relates to inkjet-printable optical ink compositions suitable for 3D printing of gradient refractive index (GRIN) optical components.

BACKGROUND OF THE DISCLOSURE

Gradient refractive index (GRIN) optical structures are composed of an optical material whose index of refraction, n, varies along a spatial gradient in the axial and/or radial directions of the lens. They have many useful applications such as making compact lenses with flat surfaces.

There are several known techniques for fabricating GRIN lenses. One approach is to press films of widely varying refractive indices together into a lens using a mold, e.g., as taught in U.S. Pat. No. 5,689,374. This process, however, is expensive to develop. A second approach for fabricating GRIN lenses is to infuse glass with ions at varying density. This approach has reached commercial production, but it is also expensive and effectively limited to small radially symmetric lenses by the depth to which ions will diffuse into glass. A third approach for fabricating GRIN lenses is to use 3D printing technology with inks composed of a polymer matrix doped with particles which change the index of refraction of the matrix. Each printed droplet has a distinct refractive index controlled by the concentration of dopants in the polymer material. This approach is described, for example, in R. Chartoff, B. McMorrow, P. Lucas, "Functionally Graded Polymer Matrix Nano-Composites by Solid Freeform Fabrication", Solid Freeform Fabrication Symposium Proc., University of Texas at Austin, Austin, Tex., August, 2003, and in B. McMorrow, R. Chartoff, P. Lucas and W. Richardson, 'Polymer Matrix Nanocomposites by Inkjet Printing', Proc. of the Solid Freeform Fabrication Symposium, Austin, Tex., August, 2005.

Although using 3D printing has the potential to provide an efficient and inexpensive means of fabricating GRIN lenses, a number of unsolved problems have prevented or significantly limited its practical realization. One of the most significant problems is that the ink compounds need to simultaneously have all the desired properties for high quality GRIN lenses while at the same time need to have properties suitable for 3D printing using inkjet technology. In particular, it is important that the doping of the host matrix creates a substantial change in the index of refraction of the host matrix, so that the GRIN lens can efficiently provide significant optical power. It is also important that the material, both when doped and undoped, be substantially transparent at wavelengths of interest (e.g., visible spectrum) so that light is transmitted through the lens rather than absorbed. At the same time, in order to be suitable for the 3D printing process, the ink material must have a low viscosity both with and without doping, and be curable by a process that does not create uncontrollable distortion of the printed lens. Despite the desirability for an ink satisfying all of these criteria, researchers have yet to understand what physical characteristics of matrix and dopant materials are sufficient to produce inks satisfying all these properties, or to discover any specific ink compounds that simultaneously possess all these properties. As a result, the realization of 3D printing of high quality GRIN lenses remains elusive.

SUMMARY OF THE DISCLOSURE

The present inventors have clearly specified for the first time the key physical characteristics of matrix materials and dopants that are sufficient to provide all the important properties suitable for 3D printing of high quality GRIN lenses. They have also discovered and described herein a variety of specific examples of such ink compounds. These inks have the following key physical characteristics. The matrix material is a monomer that is UV crosslinkable with 20% or less shrink to minimize the strain and subsequent deformation of the optical structure. The matrix material has a transmittance of at least 90% (preferably at least 99%) at the wavelengths of interest, and the viscosity of the matrix in its monomer form is less than 20 cPoise so that it can be inkjet printed. The matrix material is doped with nanocrystal nanoparticles at a loading of at least 2% by volume. The nanocrystals are selected such that a difference in index of refraction between the doped and undoped matrix material is at least 0.02, i.e., $\Delta n \geq 0.02$. The nanocrystal sizes are sufficiently small that they do not induce Mie or Rayleigh scattering at the wavelengths of interest (e.g., less than 50 nm in size for visible wavelengths, less than 100 nm for IR wavelengths). The nanocrystal material, as well as the doped matrix material, preferably has a transmittance of at least 90% (more preferably, at least 99%) in a predetermined optical wavelength range (e.g., visible spectrum). The nanocrystals are functionalized with. In some embodiments, the ligands are less than 1.2 nm as measured radially from the nanoparticle core. Some of the ligands attach to the nanoparticle core at its anchor end and has a buoy end. The buoy end is either reactive to the monomer or non-reactive to the monomer. A plurality of ligands can be used with different functionalization based on anchor and buoy ends.

BRIEF DESCRIPTION OF THE DRAWINGS

FIG. 1A: Cross-sectional schematic diagram of an optical ink composed of a matrix material doped with nanoparticles, according to an embodiment of the disclosure.

FIG. 1B: Schematic diagram of a nanoparticle functionalized with a ligand, according to an embodiment of the disclosure.

FIG. 4A: Cross-section schematic diagram of a ligand-functionalized nanoparticle.

FIG. 4B: Cross-section schematic diagram of a ligand-functionalized nanoparticle with a ligand with a buoy functional group covalently linking to a matrix material.

FIG. 4C: Cross-section schematic diagram of a ligand-functionalized nanoparticle with a branched ligand structure.

DETAILED DESCRIPTION

Figure 2:
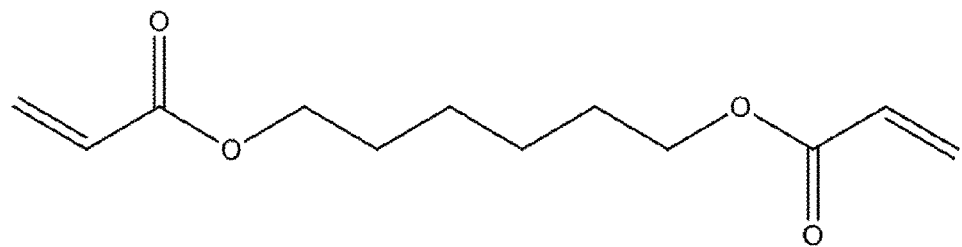
FIG. 2: Chemical structure of HDODA (1,6-hexanediol diacrylate).

Embodiments of the present disclosure include optical inks suitable for use in fabricating GRIN lenses using 3D printing technology such as standard drop-on-demand inkjet printing. These inks may also be used to fabricate GRIN lenses using other printing techniques such as screen printing, tampo printing, aerosol jet printing, and laser cure printing. The optical inks prepared according to embodiments of the present disclosure are composed of a matrix material composed of a monomer and nanoparticles dispersed in the matrix material. The nanoparticle-doped monomer matrix material (a liquid) is placed in an inkjet printhead. In addition, an adjacent inkjet printhead is filled with undoped matrix material. Additional printheads may also be filled with another optical ink with a different type or concentration of nanoparticle. Drop-on-demand inkjet printing technology is used to create microscopic, on-the-sample mixtures of the two (or more) liquids, thereby creating precisely-controlled and highly-localized regions having optical index controlled by the mixture of the undoped and doped inks. The localized composition and three dimensional structure is locked-in by polymerizing the monomeric solution into an optical-quality polymer. Each droplet of polymer that is deposited onto the substrate on which the GRIN lens is being formed, can be created with a desired concentration of nanoparticles. The volumetric concentration of nanoparticle within a given droplet volume determines the effective refractive index of that material. Drop on demand printing, such as inkjet printing, allows for the formation of three dimensional structures where different volumes within the structure contain different concentrations of dopants to effectively change the refractive index within a three dimensional structure. The creation of precise three dimensional optical lenses and other optical structures by stereolithography is known to those skilled in the art of GRIN lens design. Embodiments of the present disclosure provide inks suitable for the practical realization of such 3D printable inks for high quality GRIN lens fabrication. These inks provide the ability to control the index of refraction in three dimensions for creating large, localized index changes while maintaining high optical transmission and freedom from deleterious scattering phenomena.

Since drop-on-demand inkjet may utilize multiple printheads with different loading of the index-changing dopant, the inks provided by the present disclosure may be used in various combinations with each other as well as with other optical inks. The ability to alter, in three dimensions, the index of refraction both above and below that of the host matrix opens the design space for GRIN optical components.

According to embodiments of the present disclosure, an optical ink is composed of a matrix material 100 doped with nanoparticles 102, as shown in FIG. 1A. The matrix 100 is composed of a monomer that is capable of being UV cured to create a solid polymer, and the nanoparticles 102 are each functionalized with a ligand 104, as shown in FIG. 1B.

The matrix material 100 is a monomer that is UV cross-linkable. Preferably, the UV curing results in at most 20% shrink, which serves to minimize the strain and subsequent deformation of the optical structure. The viscosity of the matrix 100 in its monomer form is less than 20 cPoise so that it can be inkjet printed. When cured, the matrix material 100 preferably has a transmittance of at least 90% (preferably at least 99%) at the wavelengths of interest (e.g., visible spectrum).

Dispersed within the matrix 100 are nanoparticles 102 which preferably are nanocrystals. The nanoparticles 102 are present in the matrix 100 at a loading of at least 2% by volume, altering the index of refraction of the undoped matrix by at least 0.02, i.e., $\Delta n \geq 0.02$. In addition, in order to preserve transparency of the ink, the nanoparticles 102 are made sufficiently small that they do not induce Mie or Rayleigh scattering at the wavelengths of interest. For example, for GRIN lenses designed to operate in the visible spectrum, the sizes of the nanoparticles 102 are less than 50 nm. For operation in the infrared spectrum, the sizes are less than 100 nm. In addition, also to help preserve transparency, the nanoparticles 102 are preferably made of materials that transmit greater than 90% (preferably greater than 99%) of the light in a predetermined optical wavelength range (e.g., visible or infrared). In order to achieve more than 2% loading and large $\Delta n$ while also providing a well-dispersed doping (and transparency) the nanoparticles 102 are functionalized with ligands 104. In some embodiments the ligands are less than 1.2 nm in length as measured radially from the surface of the nanoparticle core. In addition, each ligand 104 is covalently bonded at its anchor end to the nanocrystal 102, and can be either covalently bonded at its buoy end to the monomer material of the matrix 100, or end in a non-reactive buoy. In addition, the buoy ends of the ligands 104 preferably repel each other to help prevent aggregation and light scattering, resulting in less than 5% scattering from aggregated nanoparticle clusters. These physical characteristics of the ligands ensure that the nanoparticles 102 are well dispersed in the matrix and that good dispersion is maintained during polymerization.

These inks will now be further described and illustrated in the context of several concrete examples. Those skilled in the art will appreciate that the principles, teachings, and techniques discussed in the following examples are not limiting but in fact provide further illustration of the range of possible inks that are encompassed within the scope of the disclosure.

According to one embodiment of the disclosure, the matrix or host polymer is 1,6-hexanediol diacrylate (HDODA), and the nanoparticle is an organometallic compound. The organometallic compound may be, for example, any of various salts of metals such as zinc (Zn2+), lead (Pb2+), titanium (Ti4+), and other metallic salts that are clear and transparent. More generally, the metallic salt may have a cation consisting of Ti4+, Pb2+, Zn2+, Al3+, Sn4+, In3+, Ca2+, Ba2+, Sr2+, Y3+, La3+, Ce3+, Nd3+, Pr3+, Eu3+, Er3+, Yb3+, Gd3+, Ho3+, Sm3+, Tb3+, Dy3+, Tm3+, Zr4+, Hf4+ or Ta5+.

Ligand functionalization of clear, transparent metallic salts provide matrix compatibility with HDODA, allowing high density loading of the organometallic salt into the matrix. Furthermore, due to a difference of index of refraction between undoped HDODA and HDODA doped with the functionalized metallic salt, GRIN lenses may be formed using drop-on-demand printing techniques such as inkjet printing. The metallic salts interact favorably with a host matrix material such that greater than 90% transparency is obtained in the spectral region spanning 375 nm through 1600 nm.

As shown in FIG. 2, HDODA is a well-known material for the fabrication of clear coatings. It has a low viscosity (7.9 cP) making it amenable towards dispensing using drop-on-demand techniques such as inkjet printing. It also has a large spectral window in which greater than 99% transparency is observed, making it ideal to construct lensing material. HDODA also has an index of refraction of 1.456. By using an organometallic compound having an index of refraction different from that of HDODA, using drop-on-demand techniques such as inkjet printing, gradient refractive index lenses may be fabricated having control of the index of refraction in three dimensions.

In order for the nanoparticle to be successfully incorporated into an HDODA solution, it must have a ligand chemistry (surface treatment) that is compatible with the HDODA. To do this, a ligand mimicking the host matrix material can be utilized to ensure that metallic salts can be incorporated into the HDODA without undergoing phase segregation, precipitation, or other means of separation from the host material.

As examples, an ink formulation may use a metal-ligand placed in 1,6-hexanediol diacrylate at 1-75 wt % with 0.1-5.0 wt % Irgacure 184 and 0.1-5.0 wt % Irgacure 819. Another ink formulation may use a metal-ligand placed in 1,6-hexanediol diacrylate at 1-75 wt % with 0.1-5.0 wt % Irgacure 184 and 0.1-5.0 wt % Irgacure 819. Another ink formulation may use a metal-ligand placed in 1,6-hexanediol diacrylate at 1-75 wt % with 0.1-5.0 wt % Irgacure 184 and 0.1-5.0 wt % Irgacure 819. Yet another ink formulation that may use a metal-ligand mixture placed in 1,6-hexanediol diacrylate at 1-75 wt % with 0.1-5.0 wt % Irgacure 184 and 0.1-5.0 wt % Irgacure 819.

Figure 3:
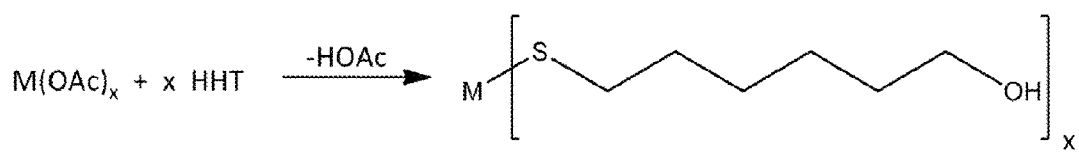
FIG. 3: Scheme for an alternate synthetic route to metallic salts of HHT.
Figure 3:
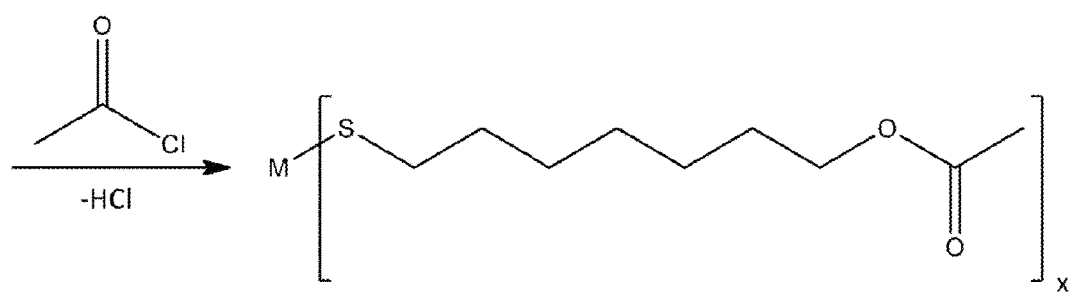

A route to obtaining the material to print this lens uses the alcohol terminated ligands as shown in reaction sequence depicted in FIG. 3.

According to another embodiment, stereolithographic techniques are used to print in 3D using droplets of the monomeric form of optical polymers (such as 1,6-Hexanediol diacrylate, aka HDDA or HDODA, or styrene) doped with varying levels of nanoparticles having an index refraction that is significantly different from that of the optical polymer. With each droplet being able to deliver a distinct refractive index, this technology allows true 3D creation of GRIN optical elements of arbitrary shape. A challenge in the past has been the limited selection of nanosized materials which are both transparent in the optical range of interest and have a significant difference in refractive index, as compared to optical polymers whose refractive index typically falls between that of polystyrene and of poly methyl methacrylate (1.592 and 1.489 respectively). According to this embodiment, diamond is used as the nanoparticle material. It has an optical window spanning from about 0.25 microns to 80 microns and a refractive index of 2.42, which is large compared to most optical polymers. Recently-developed diamond nanocrystals have dimensions less than one tenth the wavelength of light (i.e., less than or equal to 50 nm diameter particles for visible light), which minimizes Mie or Rayleigh scattering. Using drop-on-demand techniques such as inkjet printing, gradient refractive index optical components may be fabricated having control of the index of refraction in three dimensions.

The diamond nanoparticles are first coated with a ligand material which provides chemical compatibility with the optical polymer, then blended with the monomeric form of the optical material, delivered using 3D printing technology, and finally polymerized into transparent solids which serve as GRIN optical structures. Arbitrarily 2D and 3D GRIN optical components are fabricated by drop-on-demand sterolithographic inkjet printing or by other printing techniques.

Nanodiamonds are commercially available as byproducts of refineries, mining operations and quarries and are broken down to smaller sizes through ball milling and sonication. Alternately detonation nanodiamond (DND), often also called ultradispersed diamond (UDD), is diamond that originates from a detonation of an oxygen-deficient explosive mixture of TNT/RDX. In both cases particles of 4-6 nm are obtained.

For the any particle to be successfully incorporated into an optical polymer matrix, it is provided with a surface treatment (i.e., ligand) that is compatible with the polymer. The ligand is described by analogy with anchor-chain-buoy configuration in which the "anchor" end of the ligand molecule is the chemical entity that covalently binds to the surface of the diamond nanoparticle, the "buoy" at the other end is the entity which provides chemical compatibility with polymeric matrix, and the "chain" refers to the length of the linkage between the two previously mentioned entities. Carboxylates, amines, thiol groups may provide the anchor entity for bonding to the carbon-based nanodiamonds. Anchor groups are generally composed of reactive functional groups (methoxysilane, dimethoxy silane, trimethoxy silane, mono/di/trichlorosilane). The buoy group is selected to match the chemical nature host optical polymer, for example an acetylacrylate group for compatibility with acrylate-based polymers, and disperse the functionalized nanoparticles by repelling other buoys. Minimal chain lengths of 2-4 carbon atoms are effective for dispersing nanoparticles in the size range form 2-20 nm.

Ligand functionalization can be extended by using a multi-component ligand shell to control optical ink rheological properties. For instance, a two-component ligand shell can use a first ligand with reactive buoy that bonds to the organic matrix and a second ligand with a non-reactive buoy to increase solubility. The viscosity of a particle solution, such as the optical ink, scales with the concentration of particles according to Einstein's equation for dilute suspensions or as described by the Krieger-Dougherty equation for concentrated suspensions. Increased solubility allows higher loading of nanoparticles while maintaining inkjet printable viscosities thereby allowing greater changes in local refractive index within a printed optic. The ratio of two buoy groups in the initial ligand shell can range from 3:1 to 100:1, solubilizing to reactive. The ratio of solubilizing to reactive buoy groups can be optimized for either increased loading, viscosity matching to an inkjet head, or other rheological properties. Further ligand coupling structures, or extended shells, can be built from the particle surface by forming branched and hyper-branched ligand structures. Extended shells allow increased particle loading due to steric repulsion that decreases particle-to-particle interactions. The branched ligands can contain reactive buoy groups or nonreactive solubilizing groups, or combinations thereof.

Referring to FIG. 4A, a ligand-functionalized nanoparticle 400 has a core 402 with a plurality of ligands. Here, each of the ligands is attached at an anchor site along the surface of core 402. Each of the ligands have a functional buoy end that can either be reactive or non-reactive with respect to the matrix material. For convenience, the anchor ends are referenced to with an "A" and the buoy ends are referenced with a "B". An exemplary ligand 404 has an anchor 406 with a covalent bond 408 chemical bonding the ligand to the surface of nanoparticle core 402. Here, the ligand terminates at a buoy 410. In this illustrative example, the ligand is shown with a single anchor site and a single buoy site, in practice, ligands can have a plurality of such chemically active sites. As described above, the ligands have buoys that are reactive to the matrix material or non-reactive. Referring to FIG. 4B, a ligand functionalized nanoparticle 420 illustrates the exemplary ligand as that shown in FIG. 4A further providing a covalent bond 412 of buoy 410 to a matrix material 422. In other embodiments the ligand functionalized nanoparticles can have branched ligand shells that bond on sites other than the nanoparticle core.

Referring to FIG. 4C, a ligand functionalized nanoparticle 430 has the exemplary ligand as that shown in FIG. 4B, further comprising additional ligands that form branched and hyper-branched structures. A first ligand 430 is anchored to nanoparticle core 402. A second ligand is anchored to first ligand 432 without direct anchoring to the surface thereby forming a branch structure. A third ligand 434 is anchored to the second ligand forming another branched structure. Ligands can be continuously added with ligands anchoring to ligands to form hyper-branched structures. These branched ligand structures form and extend the ligand shell. The branched ligands can have buoy groups that are non-reactive, reactive, or combinations thereof.

In one embodiment, the appropriately-coated diamond nanoparticles are blended with the monomeric form of the optical polymer with a specified percent loading. The nanoparticle-doped liquid is placed an inkjet printhead, in tandem with an inkjet printhead containing pure monomer. This can be extended to multiple printheads with different percent particle loading. Drop-on-demand inkjet printing technology is used to create microscopic, on-the-sample mixtures of the two (or more) liquids, thereby creating precisely-controlled and highly-localized regions of variable optical index. The localized composition and three dimensional structure is locked-in by polymerizing the monomeric solution into an optical-quality polymer. This optical ink thus provides the ability to concurrently modify the index of refraction in three dimensions by use of the doped nanoparticles, providing the means for creating large, localized index changes while maintaining high optical transmission and freedom from deleterious scattering phenomena.

In yet another embodiment, extended or branched/hyper-branched ligand shells were prepared using ZrO2 nanoparticles (commercially available from Pixelligent under part numbers: PC20-50, PCPB-50-2, or PCPA-50). The ZrO2 nanoparticles are coated with a ligand shell anchored to the nanoparticle surface with silane functional groups. To build the extended branch structure, these particles were further reacted with ligands containing a silane anchor group and a reactive, non-reactive, or combination of both, buoy group (i.e. methoxy (Triethyleneoxy)propyltrimethoxy silane, 3-(Trimethoxysilyl)propyl methacrylate) in the presence of an appropriate catalyst (i.e. propylamine, triethylamine, ammonia, ammonium hydroxide). The reaction was carried out by combining the ligands, catalyst, and nanoparticles in the appropriate solvent (i.e. propylene glycol monomethyl ether acetate, ethanol, methanol) and heating at elevated temperature (60-120° C.) for 2-24 hours. Particles were collected via precipitation and washed prior to suspending in the monomer matrix. Similar procedures can be used to synthesize branched structures with TiO2 or ZnS nanoparticles.

According to another embodiment of the disclosure, stereolithographic techniques are used to print in three dimensions using droplets of the monomeric form of optical polymers (such as 1,6-Hexanediol diacrylate, aka HDDA, or styrene) doped with varying levels of nanoparticles having an index refraction that is significantly different from that of the optical polymer. With each droplet being able to deliver a distinct refractive index, this technology allows true 3D creation of GRIN optical elements of arbitrary shape. A challenge in the past has been the limited selection of nanosized materials which are both transparent in the optical range of interest and have a significant difference in refractive index, as compared to optical polymers whose refractive index typically falls between that of polystyrene and of poly methyl methacrylate (1.592 and 1.489 respectively). Although there are several transparent materials (such as TiO2 and ZnS) with refractive index significantly higher that of the polymer, there are very few materials with refractive index significantly lower than 1.5. According to this embodiment, microscopic hollow nanoparticles are used to effectively insert transparent, low refractive index "air-bubble" dopants into optical polymers for the fabrication of gradient refractive index (GRIN) optical components. The index-changing hollow-sphere dopants are mixed with the monomeric form of the optical polymer to create stock solutions. Drop-on-demand inkjet printing of the stock solution, followed by rapid polymerization, yields gradient refractive index optical components with control of the index of refraction in three dimensions.

With air (or other gases) in their centers, the hollow microspheres have a broad optical transmission window and an (interior) refractive index of 1.0, which is significantly smaller than that of most optical polymers. If the shell of the microsphere has a refractive index matched to that of the optical polymer matrix, it is the just the interior dimension which needs to be less than or equal to one tenth the wavelength of light to avoid Mie or Rayleigh scattering. The hollow nanoparticles may be created via a micro-emulsion technique, then coated with a ligand material which provides chemical compatibility with the optical polymer, blended with the monomeric form of the optical material, and finally polymerized into transparent solids. Arbitrarily 2D and 3D GRIN optical components are fabricated by drop-on-demand sterolithographic inkjet printing or by other printing techniques.

The nanoparticles in some embodiments may be hollow nanospheres or any carbon nanostructure (tube, buckeyball, nanodiamond, etc.) with a gaseous or empty core. Polymeric and inorganic-shelled hollow microspheres may be fabricated using micro-emulsion techniques, yielding microspheres of sizes down to 100 nm. To minimize Mie or Rayleigh scattering dimensions are preferably less than one tenth the wavelength of light (e.g., at most 50 nm diameter particles for visible light). If the refractive index of the shell material is matched to that of the polymeric host, it is only the interior dimension that encompasses the low index gas that needs to be at or below one tenth the wavelength of light.

In order for the nanomaterial to be successfully incorporated into an optical polymer matrix, it is provided with a surface treatment (using ligand chemistry) that is compatible with the polymer. Carboxylates, amines, thiol groups provide the anchor entity for bonding to the carbon-based nanodiamonds. The buoy group is selected to match the chemical nature host optical polymer, for example an acetylacrylate group for compatibility with acrylate-based polymers. Minimal chain lengths of 2-4 carbon atoms are effective for dispersing nanoparticles in the size range form 2-20 nm.

The invention claimed is:

1. An optical ink comprising:
   a monomer matrix material doped with ligand-functionalized nanoparticles, wherein the monomer has a viscosity less than 20 cPoise and is UV curable to form a solid polymer;
   the matrix material doped with the ligand-functionalized nanoparticles has a transmittance of at least 90% in a predetermined optical wavelength range, wherein the ligand functionalized nanoparticles have a size less than 100 nm, are loaded in the monomer matrix material at a volume percent of at least 2%, and alter an index of refraction of the monomer matrix by at least 0.02; and
   the ligand-functionalized nanoparticles have a plurality of ligands attached to a nanoparticle core surface with an anchor functional group and terminated with a buoy functional group that are reactive, non-reactive, or combinations thereof.

2. The optical ink of claim 1, wherein buoy functional group prevents migration within the matrix material.

3. The optical ink of claim 1, wherein the buoy functional group increases solubility of the ligand-functionalized nanoparticles within the matrix material.

4. The optical ink of claim 3, wherein non-reactive buoy functional groups increase solubility.

5. The optical ink of claim 1, wherein that ratio of the buoy functional groups that are non-reactive to reactive is in a range from 3:1 to 100:1.

6. The optical ink of claim 5, wherein the ratio is chosen to have a viscosity that is specified for an inkjet print head.

7. The optical ink of claim 5 wherein the ratio is chosen to allow increased ligand-functionalized nanoparticle loading.

8. The optical ink of claim 1, further comprising a branched ligand, the branched ligand indirectly attached to nanoparticle core by covalent bond to at least one of the plurality of ligands, or another branched ligand.

9. The optical ink of claim 7, wherein the branched ligand loading is increased per ligand functionalized nanoparticle in order to increase loading of the ligand-functionalized nanoparticles within the matrix material.

10. The optical ink of claim 1, wherein the ligand length as measured radially from the surface of the nanoparticle core is 1.2 nm.

* * * * *